United States Patent [19]

Yamagishi et al.

[11] Patent Number: 5,157,523
[45] Date of Patent: Oct. 20, 1992

[54] PROJECTION TYPE LIQUID CRYSTAL DISPLAY UNIT INCLUDING ORTHOGONAL PHASE PLATES

[75] Inventors: Nobuyasu Yamagishi, Hirakata; Hiroshi Watanabe, Yawata; Kazuo Yokoyama, Hirakata, all of Japan

[73] Assignee: Matsushita Electric Industrial Co., Ltd., Osaka, Japan

[21] Appl. No.: 497,971

[22] Filed: Mar. 23, 1990

[30] Foreign Application Priority Data

Mar. 29, 1989 [JP] Japan ................... 1-078845

[51] Int. Cl.$^5$ ...................... G03G 21/00; G03G 21/26
[52] U.S. Cl. ........................ 359/41; 353/31; 353/34; 359/73
[58] Field of Search ................ 350/339 RUS, 339 F, 350/337, 347 E, 347 R, 331 R, 331 T, 400 US, 403 US, 404 US, 408 US; 359/41, 73; 353/31, 34, 48, 49, 122

[56] References Cited

U.S. PATENT DOCUMENTS

| 3,457,414 | 7/1969 | Ragen et al. ............... 350/404 X |
| 4,239,349 | 12/1980 | Scheffer ....................... 350/347 R |
| 4,343,535 | 8/1982 | Bleha, Jr. ...................... 350/342 |
| 4,385,806 | 5/1983 | Fergason ..................... 359/73 X |
| 4,595,262 | 6/1986 | Ogle ............................. 350/404 |
| 4,786,146 | 11/1988 | Ledebuhr ................... 350/331 R |
| 4,844,569 | 7/1989 | Wada et al. ................ 350/347 R |
| 4,852,976 | 8/1989 | Suzuki ........................ 390/339 R |
| 4,904,061 | 2/1990 | Aruga ........................ 350/339 F |
| 4,906,073 | 3/1990 | Hunahata ................... 350/347 R |
| 4,909,601 | 4/1990 | Yajima et al. .............. 350/331 R |
| 4,909,606 | 3/1990 | Wada et al. ................ 350/347 R |
| 4,995,702 | 2/1991 | Aruga ........................ 350/331 R |

FOREIGN PATENT DOCUMENTS

| 0266184 | 5/1988 | European Pat. Off. . |
| 62293227 | 12/1987 | Japan . |
| 1173012 | 7/1989 | Japan ................... 350/337 |
| 1-277282 | 11/1989 | Japan . |

OTHER PUBLICATIONS

Kahn et al., "Temperature Dependence of Mu tiplexed Twisted Nematic Liquid Crystal Displays", *Non-Emissive Electro-Optic Displays*, ed. Kmetz et al., Plenum Press, New York, 1976.
Hilsum et al., "A Novel Method of Temperature Compensation Formultiplexed Liquid Crystal Displays", Electronic letters, v14, Jul. 6, 1978, pp. 430–432.
Scheffer et al., Optimum Polarizer Combinations for Twisted Nematic Displays, Oct. 1976.
Arai, "Single Layer, Backlit LCD Employs Optical Retardation Film", JEE Journal of Electronic Engineering, vol. 25, No. 262, pp.108-110, Oct. 1988.

*Primary Examiner*—Stanley D. Miller
*Assistant Examiner*—Ron Trice
*Attorney, Agent, or Firm*—Stevens, Davis, Miller & Mosher

[57] ABSTRACT

A projection type liquid crystal display unit has dichroic mirrors capable of dividing a light from a light source into R, G and B components which are guided along respective light paths. Each of at least two of these light paths in provided with an optical system which includes a pair of polarizing plates, a twist nematic liquid crystal and at least one phase plate. The angles of the retardation phase axis of the phase plate and light-interruption axes of the polarizing plates or, alternatively, the retardation of the phase plate is determined so as to improve the light-interruption of the liquid crystal panel in light-interruption mode, thereby enhancing contrast of the display image.

2 Claims, 20 Drawing Sheets

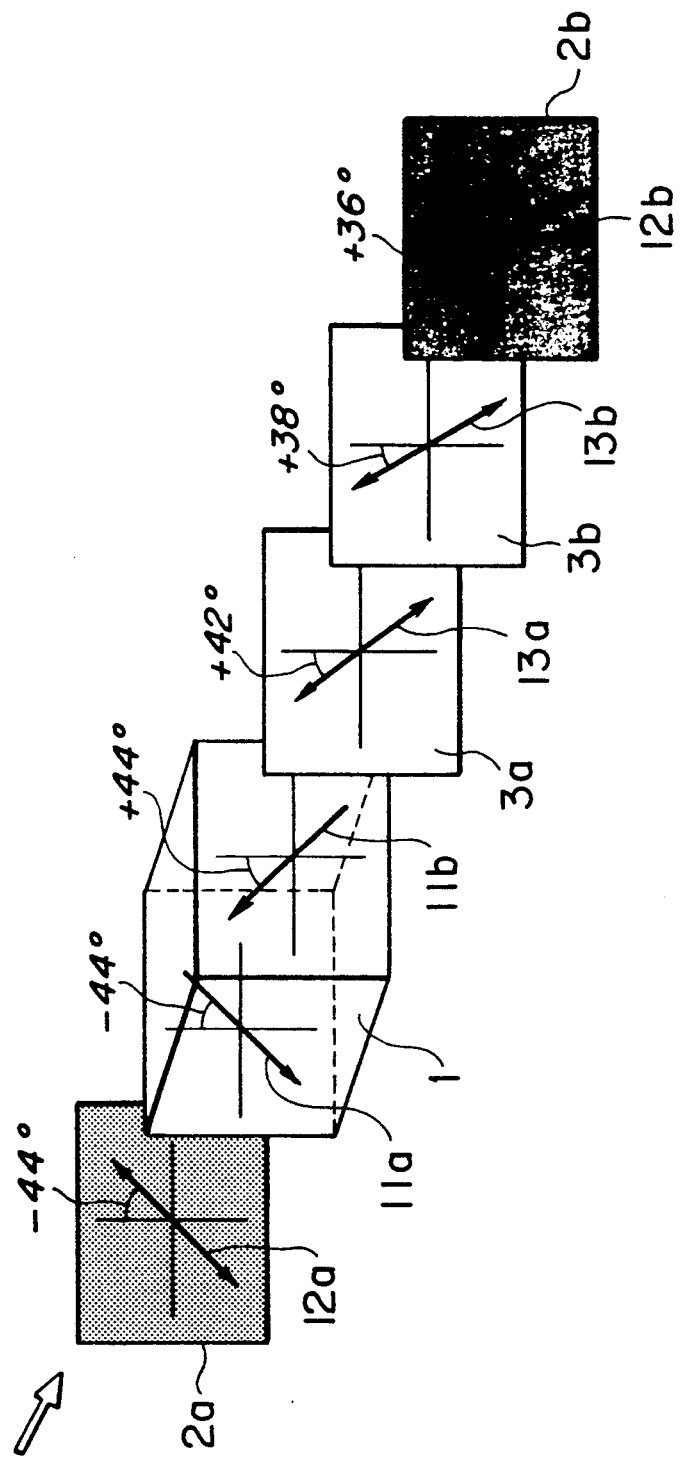

PROJECTION TYPE LIQUID CRYSTAL DISPLAY UNIT INCLUDING ORTHOGONAL PHASE PLATES

BACKGROUND OF THE INVENTION

The present invention relates to a projection type liquid crystal display unit which exhibits a high quality display image and, more particularly, to an optical arrangement around a liquid crystal cell in such a unit.

In recent years, projection type display units have received attention as such devices can provide a large size display relatively easily. In particular, projection type liquid crystal display units, which make use of a liquid crystal panel as a light valve are commercially available, with a compact and bright display. FIG. 13 schematically shows an optical system used in a prior art front projection type liquid crystal display unit. White light produced by a light source lamp 51 is collected by means of a light collecting mirror 52 and is divided by a pair of dichroic mirrors 53, 54 into three components: namely, blue light (B) 55 having wavelengths of 400 to 510 nm, green light (G) 56 having wavelengths of 490 to 580 nm and red light (R) 57 having wavelengths of 570 to 700 nm. These light beams of three colors are made to impinge upon liquid crystal display panels 58, 59 and 60 for blue, green and red colors, respectively, so that the light intensities of the light beams of the respective colors are spatially modulated. The light beams emanating from these panels are integrated through a pair of dichroic mirrors 61, 62 to form a composite light beam which is projected on a front screen by means of a projection lens 63. It is thus possible to obtain a color display of a large size. A liquid crystal driving circuit capable of controlling the light intensity modulation is connected to each of the liquid crystal display panels, so that the display is controlled in accordance with externally supplied electrical signals. In general, the liquid crystal panel incorporated in this kind of projection type liquid crystal display unit is a twist nematic liquid crystal panel (hereafter referred to as "TN liquid crystal panel") of active-matrix type incorporating thin-film transistors. FIG. 14 shows in section an example of such a TN liquid crystal panel of active matrix type. As will be seen from this Figure, the liquid crystal display panel has a liquid crystal cell 1 and a pair of polarizing plates 2a, 2b which are arranged on both sides of the liquid crystal cell 1, the liquid crystal cell 1 having an array substrate 5a carrying a matrix of several tens to several hundreds of thousands of pixel electrodes 7, a film transistor 9, an opposing substrate 5b and a liquid crystal layer 6 formed between these substrates. The inner surfaces of the substrates have been orientation-treated, for example, by rubbing, such that both substrates give orientation in directions which substantially orthogonally cross each other. As a result, the liquid crystal molecules in the vicinity of the substrates are arranged such that their longer axes are directed in conformity with the orientation directions, so that the molecules in the liquid crystal layer are arranged in a twisted condition. Any light which is transmitted through the liquid crystal cell is rotated due to double refraction characteristics of the liquid crystal molecules and the twisted arrangement of the liquid crystal molecules. This phenomenon will be referred to hereafter as "optical rotation". When a voltage is applied to the liquid crystal cell, an electric field is generated in the thicknesswise direction of the liquid crystal layer so that the liquid crystal molecules are rearranged such that molecule axes of the liquid crystal molecules rise up and extend in the direction of the electric field, due to dielectric anisotropy of the liquid crystal molecules. As a result, the twist of the liquid crystal molecules and, hence, the optical rotation are extinguished. It is therefore possible to control the quantity of light passing through the liquid crystal panel by varying the voltage applied to the liquid crystal cell through a pair of polarizing plates arranged on both sides of the liquid crystal cell. When the two polarizing plates are arranged with their transmission axes extending in parallel with each other, a mode called "normally black mode" (hereafter referred to as "NB mode", ) is obtained in which the display becomes dark when no voltage is applied, whereas, when the arrangement is such that the transmission axes of these two polarizing plates are orthogonal to each other, a mode called "normally white mode" (referred to as "NW" mode, hereinafter) is obtained. The NB mode is preferably used as the liquid crystal panel of a projection type liquid crystal device because this mode presents a greater ratio of opening and, hence, a brighter display.

The optical rotary power in the liquid crystal layer varies according to the wavelength, so that the transmittance of the liquid crystal panel varies depending on the wavelength. This phenomenon will be referred to a optically rotatory dispersion. The liquid crystal panels for R, G and B colors, which receive light beams of different wavelengths, are required to have optical characteristics which adapt to the respective wavelength regions. Therefore, in order to conduct a dark display or a display with a certain degree of contrast in the NB mode it is necessary that the liquid crystal panels for B, G and R colors have thicknesses which are determined in accordance with the wavelength regions of the respective colors or that the angles at which the optical axes of the polarizing plates are set are determined in accordance with the wavelength regions of the respective colors. FIG. 15 shows spectral transmission characteristics of B, G and R panels having different thicknesses of the liquid crystal layer, as observed when these panels are in a dark display state. The panel for B color interrupts light of wavelengths around 460 nm, while panels for G and R colors interrupt light of wavelengths around 540 nm and 610 nm, respectively. The wavelength regions of light interrupted, however, are narrow due to optically rotatory dispersion.

FIG. 16 shows intensity distributions of the light impinging upon these panels. These light beams have been obtained by separation through dichroic mirrors and have wavelength region widths of about 100 nm. Such widths are necessary for obtaining a bright display. The panels shown in FIG. 15, therefore, cannot satisfactorily interrupt the light shown in FIG. 16, so that a display with high contrast and display of pure black color cannot be conducted with the composite light composed of light of these three color. The levels of contrast obtained in the above-described display unit are shown below.

| Panels | B | G | R |
| --- | --- | --- | --- |
| Contrast levels | 40 | 80 | 95 |

It is also to be pointed out that, in a projection type liquid crystal display unit which employs a high-power light source, the temperature of the whole unit and of the liquid crystal display panel is gradually raised to a level about 20° C. higher than the room temperature so as to cause a change in the spectral characteristic of the liquid crystal panel. Thus, the wavelength of minimum transmittance in each liquid crystal panel is shifted to the shorter wavelength side in amount of about 20 nm. As a result, the deviation of the optical characteristics of the liquid crystal panel from the color light of intensity distribution shown in FIG. 16 is increased, thus further degrading the quality of the display image. Furthermore, the liquid crystal display unit of the type described necessitates liquid crystal cells of different thicknesses for different colors and, hence, a complicated production process is required which hampers production.

The liquid crystal display unit of the second-mentioned type, i.e., the unit in which the display panels for B, G and R colors have different set angles of polarizing plates, exhibits light interrupting characteristics of even greater inferiority to those shown in FIG. 15, so that the quality of the display image is inferior even in comparison with that of the first-mentioned type of liquid crystal display unit.

In order to obviate the above-described problems, the specification of Japanese Patent Unexamined Publication No. 1-277282 proposes a method in which the liquid crystal panel for each color is provided with a compensation liquid crystal cell which has the same value of the product $\Delta nd$ of the double refraction index $\Delta n$ and the liquid crystal layer thickness d ($\Delta nd = \Delta n \times d$) as the color liquid crystal panel and a twisting direction opposite to that of the color liquid crystal display panel. This method makes it possible to obtain a display image of a high contrast, as well as a pure black display. Unfortunately, however, this method causes about 30% reduction in the brightness, making it difficult to obtain a display having a high level of brightness. Furthermore, this method undesirably raises the production cost, because the number of the liquid crystal cells employed is doubled.

Thus, the known projection type liquid crystal display units and display method have suffered from problems such as incompatibility between bright level of display and ability to conduct high-contrast and pure black display, degradation of the display image quality due to a temperature change, and high production cost.

SUMMARY OF THE INVENTION

Accordingly, an object of the present invention is to provide a projection type liquid crystal display device which can overcome the above-described problems of the prior art.

According to the present invention, there is provided a projection type liquid crystal display unit having a plurality of light paths for lights of different wavelength regions, characterized in that each of at least two of the light paths is provided with an optical arrangement which has a pair of polarizing means, a twist nematic liquid crystal cell and at least one phase plate, wherein the optical arrangements associated with different light paths have different values of directions of orientation of the liquid crystal cell substrates and angles formed between the retardation axis of the phase plate and the light interruption axis of the polarizing means, or different retardation values of the phase plate.

According to this arrangement, it is possible to improve both the light interruption characteristic in dark display mode and brightness level in bright display mode of a liquid crystal panel used in projection type liquid crystal display unit. With this liquid crystal panel, it is possible to project and display an image with a high contrast and to conduct a pure black display with a good image quality. In addition, reduction in the image contrast and change in the display color, attributable to a change in temperature of the liquid crystal cell, can be suppressed advantageously. Furthermore, a plurality of liquid crystal cells used in the liquid crystal display unit can have the same optical characteristics, so that liquid crystal cells of an identical construction can be used for different colors. In addition, it is not necessary to employ any compensation liquid crystal cell. Thus, the production cost can be reduced appreciably.

By placing a phase plate having the double refraction characteristic between the liquid crystal cell and the polarizing means, it is possible to change the state of polarization of the light before and after passing a liquid crystal cell, and to vary the spectral transmission characteristic of the optical arrangement composed of two polarizing means, phase plate and the liquid crystal cell. This feature makes it possible to obtain a characteristic in which light interruption in dark display and high transmittance in bright display are compatible, i.e., spectral transmission characteristics corresponding to the light intensity distribution of the incident light, by suitably determining the angles of optical axes of the phase plate and polarization means. Furthermore, in view of a change in spectral transmission characteristic due to a change in temperature, the initial spectral transmission characteristic is selected such that the interruption of light in a dark display can be conducted over a wide wavelength range so that degradation of the image quality due to temperature changes can be reduced.

BRIEF DESCRIPTION OF THE DRAWINGS

The present invention will be described in more detail with reference to the accompanying drawings in which:

FIGS. 10A to 10C are illustrations of the set angles of optical axes in the optical component used in a fourth embodiment of the present invention;

DESCRIPTION OF THE PREFERRED EMBODIMENTS

First Embodiment

A description will be given of a first embodiment of the present invention. This embodiment is a front projection type liquid crystal display unit in which a pair of phase plates are used for each of the liquid crystal cells so as to effect compensation on the light coming out of the liquid crystal cell thereby providing projection display of a high quality.

Figure 1:
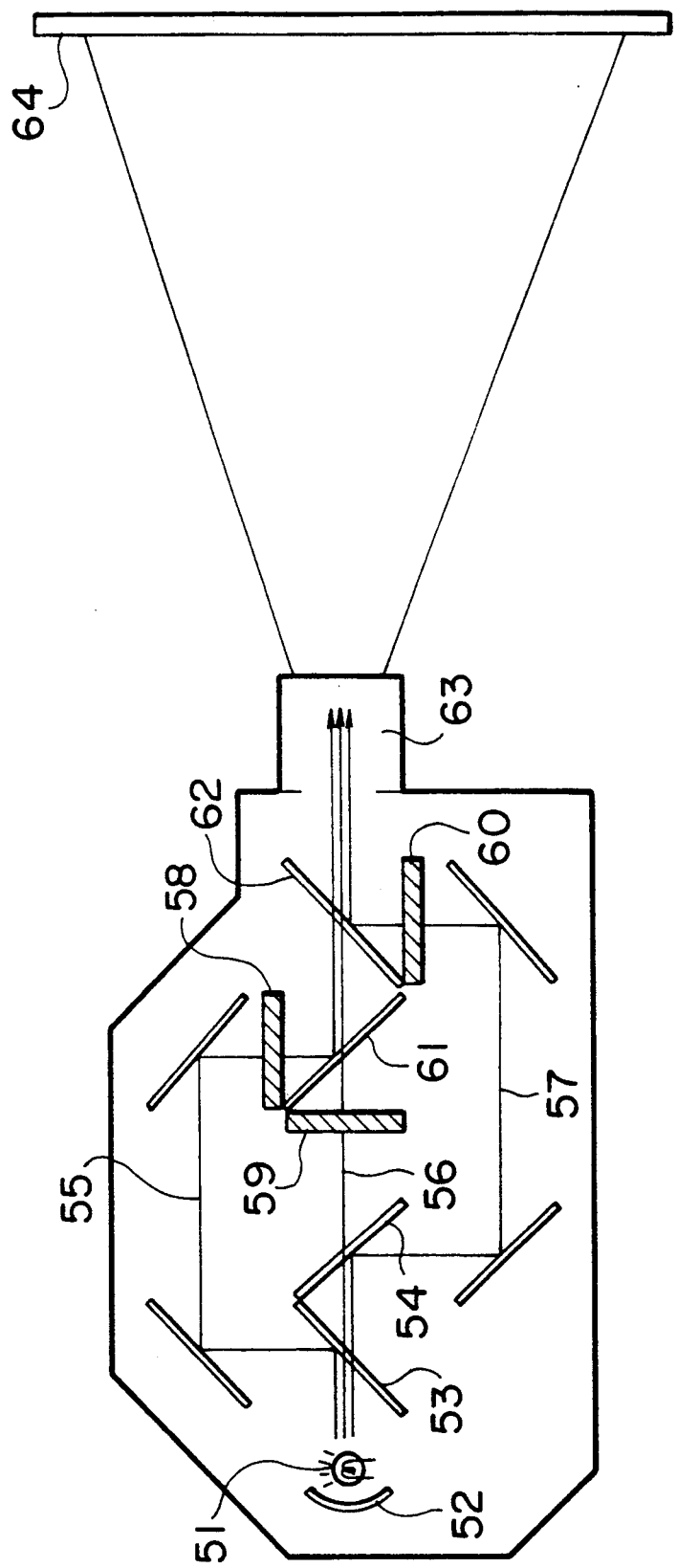
FIG. 1 is a schematic illustration of the whole optical system in a first embodiment of the present invention.
Figure 2:
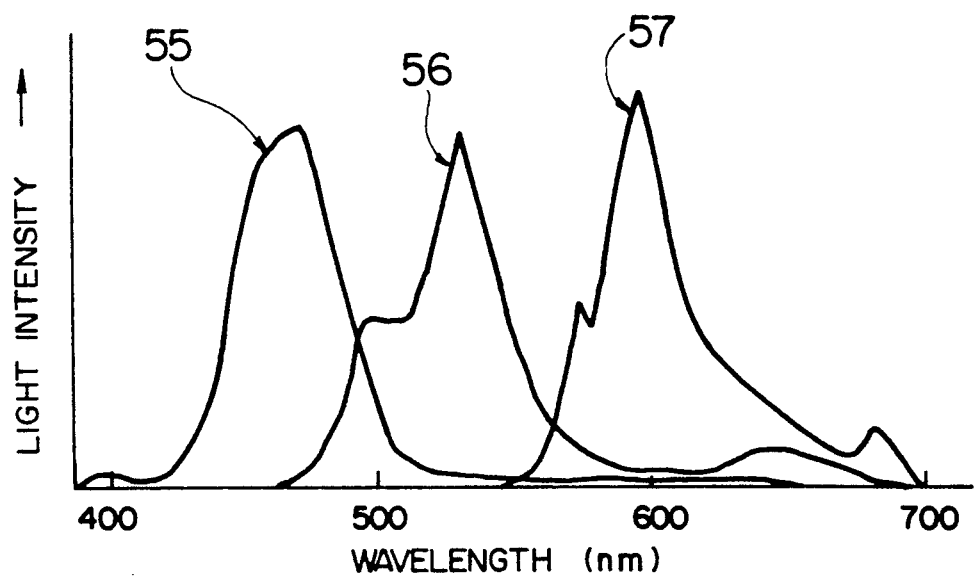
FIG. 2 is an illustration of the spectral characteristic of the light incident upon each liquid crystal panel incorporated in the embodiment shown in FIG. 1.

FIGS. 1 and 3a to 3c are illustrations of construction of the first embodiment. More specifically, FIG. 1 is a schematic illustration of the optical system incorporated in the projection type liquid crystal display unit. The construction of the whole optical system is substantially the same as that of the known apparatus. Thus, a white light from a light source lamp 51 is divided into blue, green and red lights 55, 56 and 57 by means of a pair of dichroic mirrors 53 and 54, and these lights of blue, green and red colors are respectively introduced to three liquid crystal panels 58, 59 and 60. FIG. 2 illustrates the intensity distributions of the blue, green and red lights 55, 56 and 57.

Figure 3A:
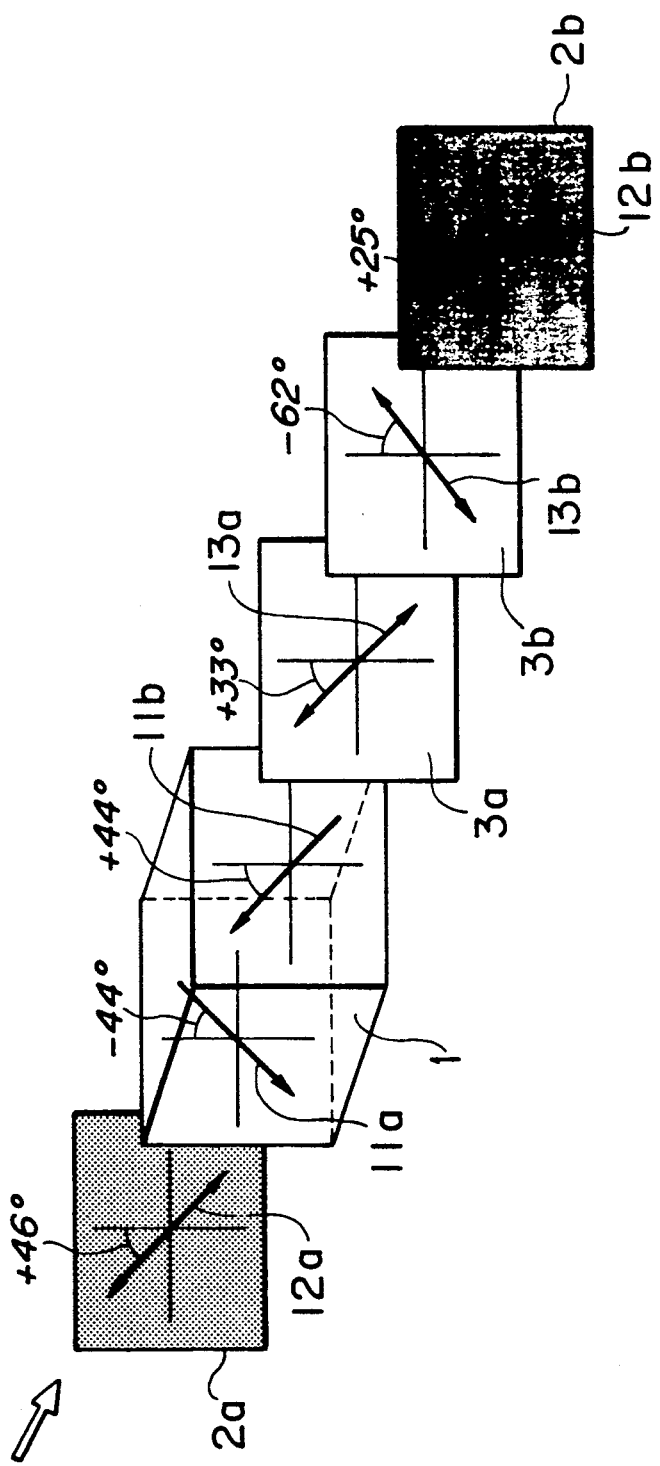
FIGS. 3A to 3C are illustrations of set angles of optical axes.
Figure 3B:
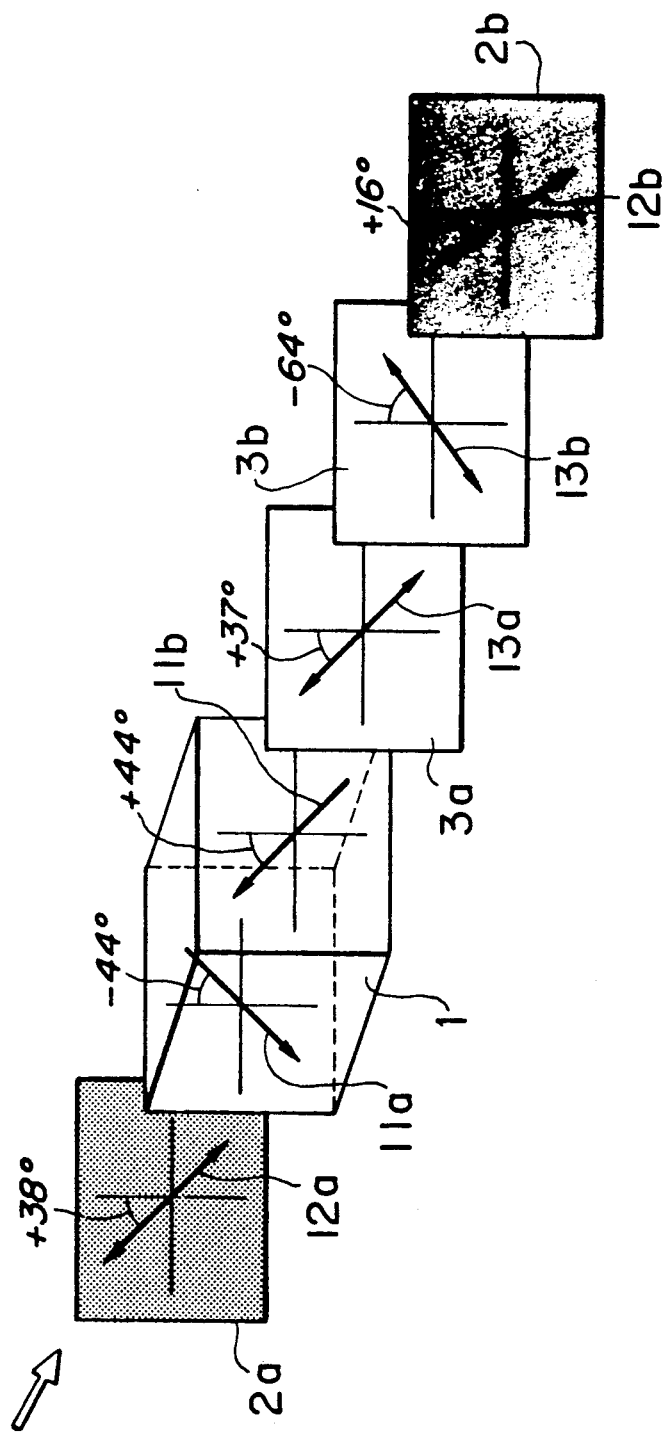
Figure 3C:
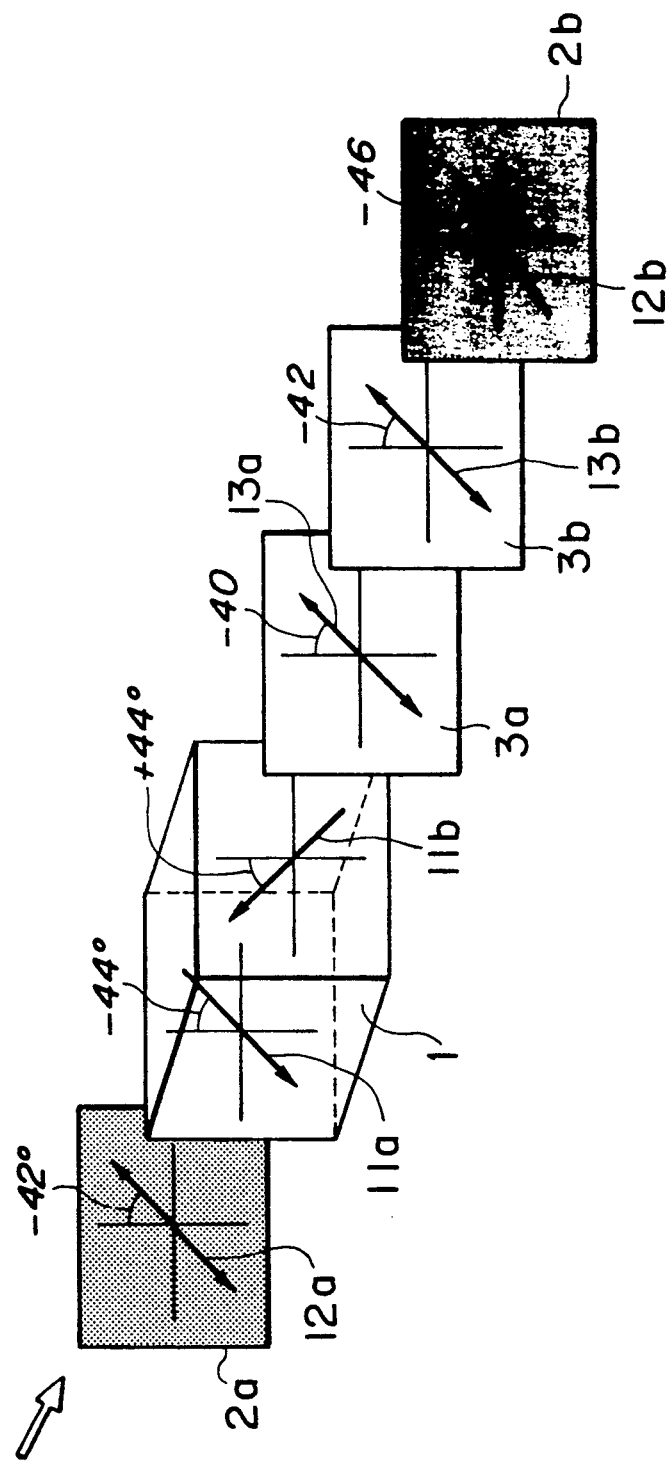
Figure 14:
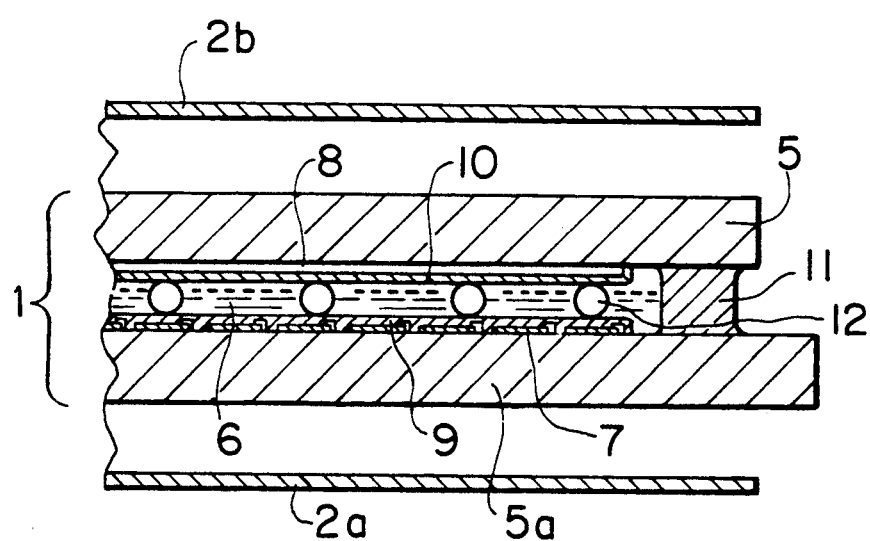
FIG. 14 is a sectional view of prior art liquid crystal panel used in a projection type liquid crystal display unit.
Figure 15:
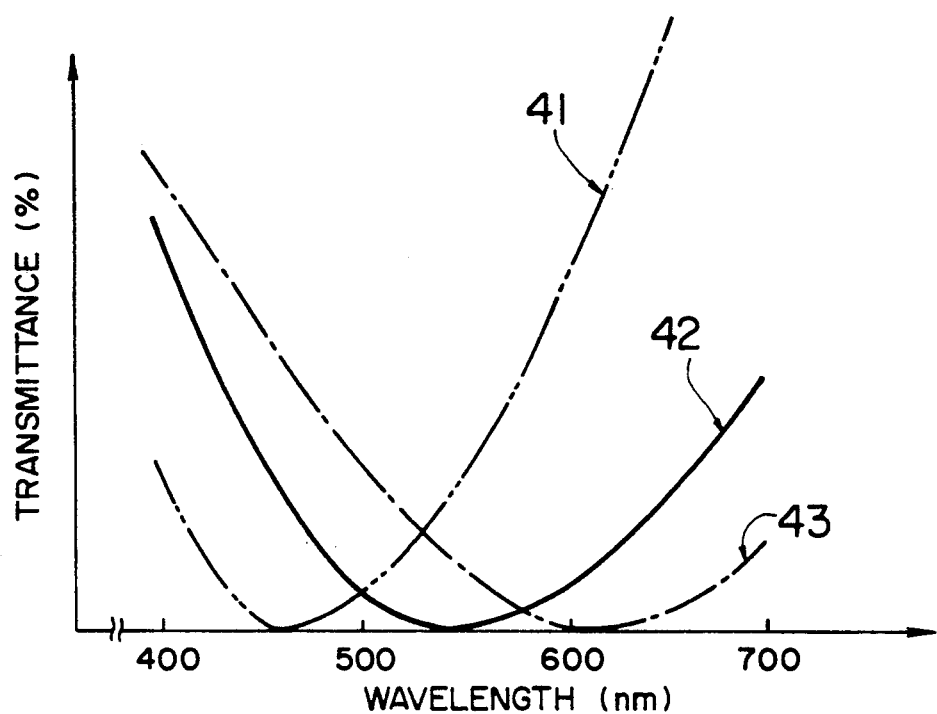
FIG. 15 is an illustration of optical characteristics of an ordinary liquid crystal panel used in a projection type liquid crystal display unit, showing particularly the spectral transmission characteristic in dark display operation.
Figure 16:
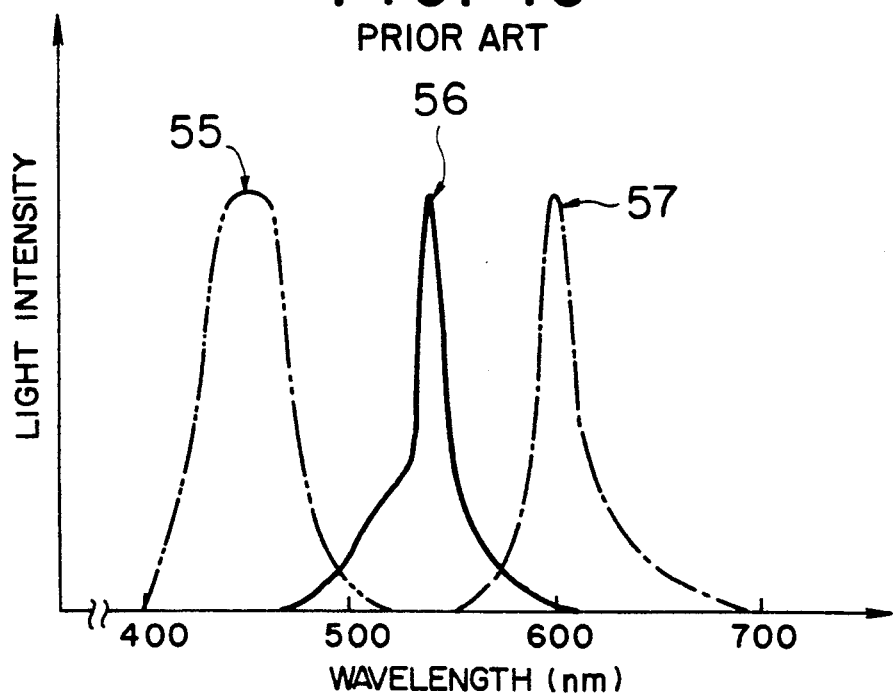
FIG. 16 is a graph showing the spectral characteristic of a light incident upon a liquid crystal panel of an ordinary forward projection type liquid crystal display unit.

FIGS. 3A to 3C shows set angles of optical axes in three optical arrangements which are respectively disposed in the light paths for blue green and red color lights 55, 56 and 57, each arrangement includes polarizing plates, TN liquid crystal cell and phase plates. The pair of polarizing plates and the optical elements sandwiched between the polarizing plates will be collectively referred to as a liquid crystal panel. Thus, each liquid crystal panel has, as shown in FIGS. 3A to 3C, a pair of polarizing plates 2a, 2b, a liquid crystal cell 1 and a pair of phase plates 3a, 3b. The phase plates 3a, 3b are disposed between the liquid crystal cell 1 and the light-emitting polarizing plate 2b. The liquid crystal cell 1 is of NB mole having about 90,000 pixels, and has a sectional construction which is similar to that shown in FIG. 14. These three liquid cells 1 are identical both in construction and optical characteristic. Each liquid crystal has a rightward twist at an angle of 88°. The double refraction index Δn of each liquid crystal is 0.093, and the thickness of each liquid crystal layer is 5.0 μm.

The set angle of the optical axis and the direction of twist of the liquid crystal are defined as follows. Namely, counter-clockwise and clockwise directions of the set angle as viewed from the light emitting side are defined as being positive and negative, respectively. While a twisting direction which presents clockwise rotation as viewed from the light emitting side as the light proceeds is determined as rightward twist.

In the panel for the blue color light B, the phase plate 3a on the light incident end has a retardation value Δnd of 300 nm, while the phase plate 3b on the light emitting side has a retardation value Δnd of 450 nm. These phase plates have optical axes which are set in the manner shown in FIG. 3A. The direction 11b of orientation of the light-emitting side of the liquid crystal cell, retardation phase axes 13a, 13b of two phase plates, and the direction 12b of transmission axis of the light emitting side polarizing plate are arranged with leftward twist in relation to the direction of travel of the light. In addition, the retardation phase axis 13b of the light-emitting side phase plate is rotated through 90° from the direction 12b of the transmission axis. In the panel for the G color, both phase plates 3a, 3b have a retardation value Δnd of 300 nm. The optical axes are set in the manner shown in FIG. 3B. Thus, the arrangement of the optical axes is substantially the same as that in the panel for the B color, although the values of angles are different. In the panel for the R color, two phase plates 3a, 3b have the same retardation value: namely, Δnd of 450 nm. The optical axes are arranged in a manner shown in FIG. 3C. Namely, the retardation phase axes 13a, 13b of two phase plates and the direction 12b of the transmission axis of the light-emitting side polarizing plate are arranged with a leftward twist with respect to the direction of running of the light, but the retardation phase axis 13a of the incident-side phase plate forms about 90° to the direction 11b of orientation of the light-emitting side of the liquid crystal cell.

Figure 4:
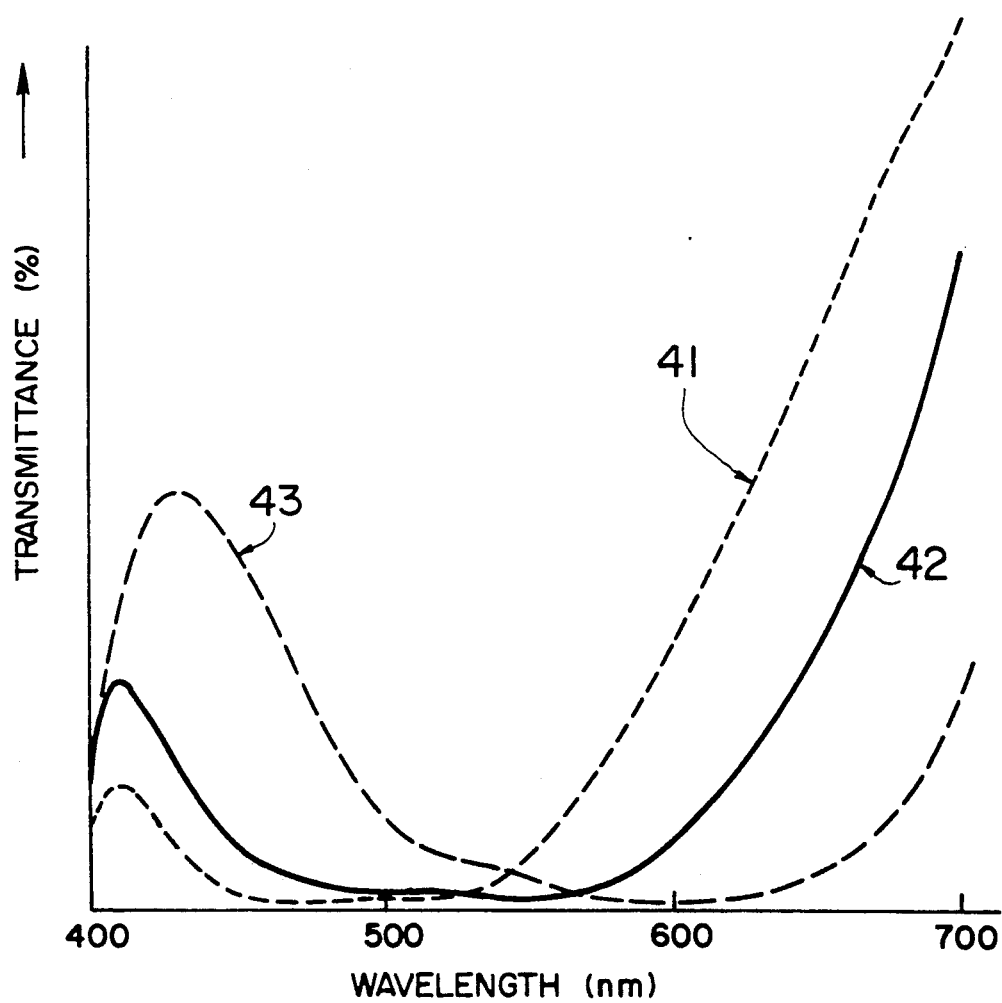
FIG. 4 is a graph representing the optical characteristic of the first embodiment, showing, in particular, the transmission characteristic in dark display operation.

FIG. 4 illustrates the optical characteristics of the panels for the respective colors. More specifically, this Figure is a graph showing the spectral transmission characteristics as obtained when no voltage is applied. The transmittance is lowered in the wavelength regions corresponding to the light intensity distributions of the light incident upon the panels shown in FIG. 2, thus proving superior light interrupting characteristics. The contrast levels exhibited by these panels for the respective panels at cell temperature of 25° C. are shown in the following table.

| Panels | B | G | R |
| --- | --- | --- | --- |
| Contrast levels | 194 | 316 | 377 |

It will be seen that a remarkable improvement in contrast has been attained as compared with the conventional arrangement. In this embodiment, as shown in FIG. 4, the wavelength region of low transmittance of each panel is expanded slightly in the longer-wavelength side from the intensity distribution of the light source shown in FIG. 2, in order to maintain good light interrupting effect even when the liquid cell temperature is raised. This measure is quite effective particularly in a projection type liquid crystal display unit in which the temperature of the liquid crystal cell tends to become high. It was confirmed that the contrast of levels substantially the same as those at 25° C. is obtainable when the liquid crystal cell temperature is raised to 45° C.

The described arrangement also improves the brightness of the display when voltage is applied. The luminance levels of the panels are shown below in terms of percentage to that obtained in conventional arrangement. It will be understood that a remarkable improvement in luminance has been achieved in the liquid crystal panels for blue and green colors, although the luminance of the panel for red is substantially the same as that in the conventional arrangement.

| Panels | B | G | R |
|---|---|---|---|
| Luminance levels | 127 | 151 | 93 |

It is also to be noted that the variation in the color tone in a halftone display is reduced as compared with the conventional arrangement, and color reproducibility of the projection display also is improved.

Although a front projection type display unit has been described, it was confirmed that superior quality of the display is obtainable also when the embodiment is applied to a rear projection type display unit.

Second Embodiment

A description will be given of a second embodiment of the invention which is a rear projection type liquid crystal display unit having a display screen size of 40 inches. In this embodiment, the phase plates are used only for one of the liquid crystal cells so as to realize a superior quality of projected display at a low cost.

Figure 5:
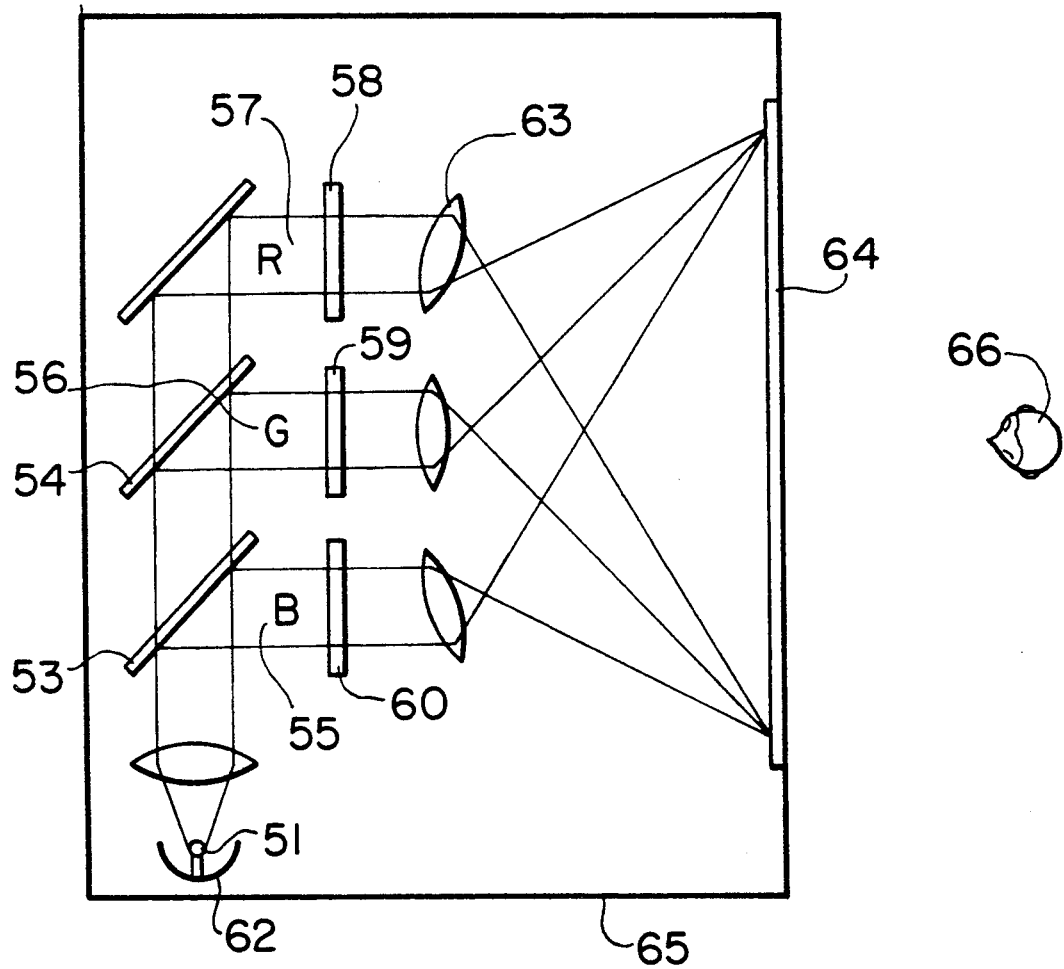
FIG. 5 is a schematic illustration of the whole optical system in a second embodiment of the present invention.

FIGS. 5, 6A, 6B and 6C are illustrations of a second embodiment of the present invention. More specifically, FIG. 5 is a schematic illustration of the optical system of the projection type liquid crystal display unit of the second embodiment, arranged to project light from the rear side of a screen 64. The light source, the optical system and the screen are constructed as a unit. A white light beam emitted from a light source lamp 51 is divided into blue, green and red colored light 55, 56 and 57 by means of a pair of dichroic mirrors 53 and 54 and these light beams are applied to three liquid crystal panels 58, 59 and 60, respectively. The intensities of the respective colors are modulated by the respective panels and the thus modulated color light beams are projected through lenses 63 onto the screen 64 so that a composite color display is obtained on the screen 64. The blue, green and red color light beams 55, 56 and 57 have the same intensity distributions as those in Example 1 shown in FIG. 2.

Figure 6A:
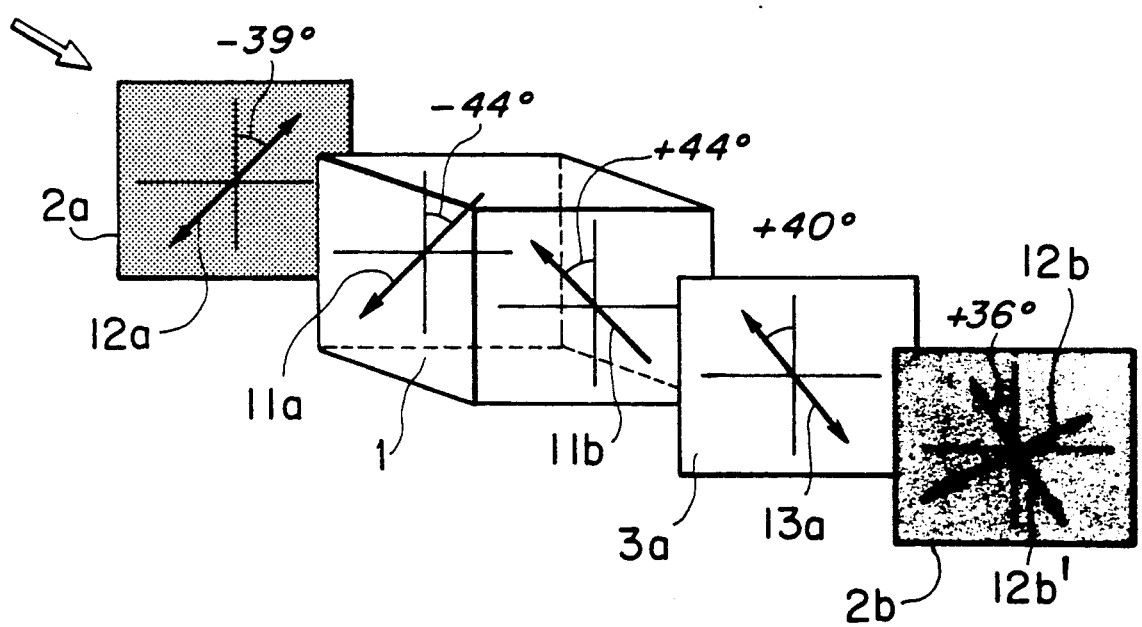
FIGS. 6A to 6C are illustrations of set angles of the optical axes in the second embodiment.
Figure 6B:
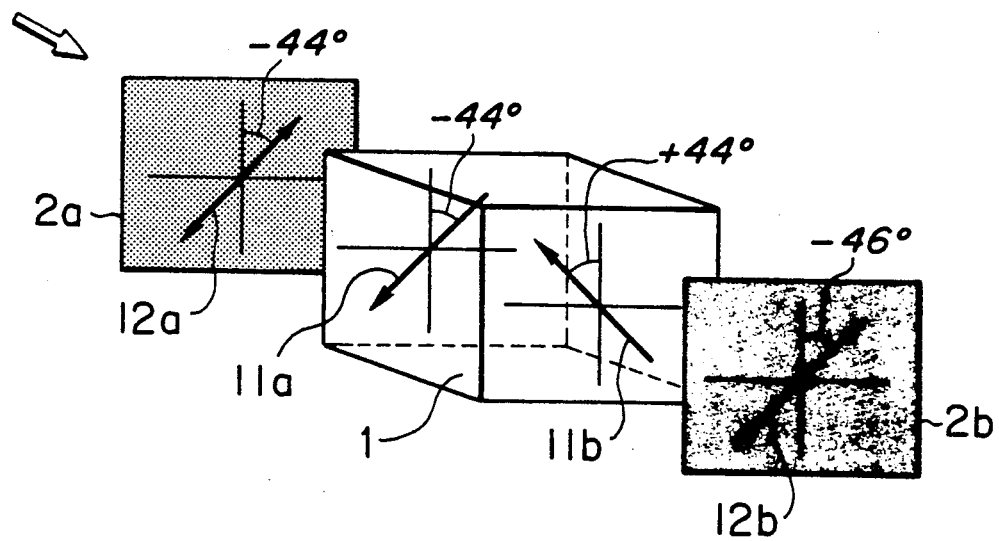
Figure 6C:
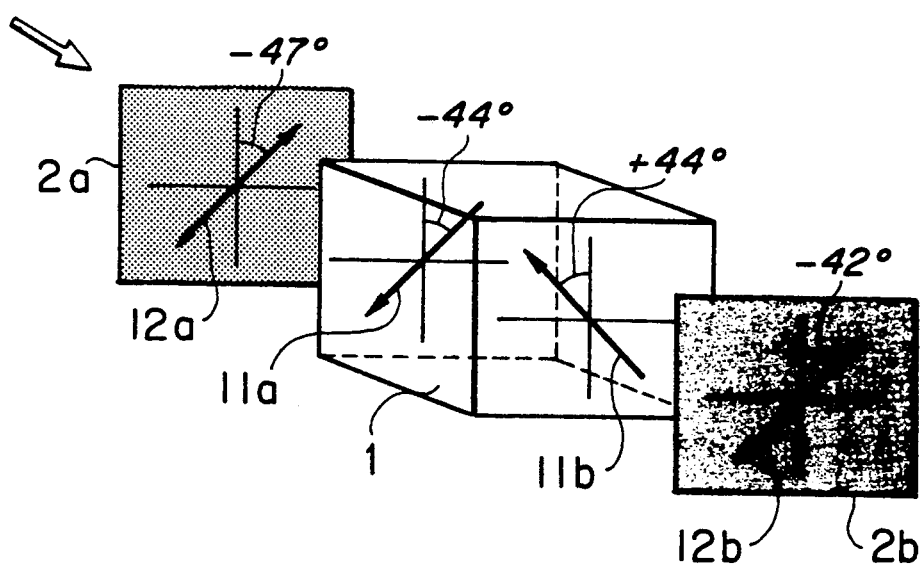

FIG. 6a shows set angles of optical axes in an optical arrangement which is disposed on the light path of the blue color light 55 and which has a pair of polarizing plates, a TN liquid crystal cell and phase plates. Similarly, FIGS. 6a and 6b show the setting angles of optical axes of the optical arrangements which are disposed on the paths of green and red color light 56, 57 and each of which is composed of a pair of polarizing plates and a TN liquid crystal cell. Thus, in this embodiment, the phase plates 3 are used only in the optical arrangement associated with the panel for blue color light, while the panels for the green and red colors are devoid of any phase plate. Namely, in this embodiment, the phase plate is used only for the blue color which exhibits the greatest influence of optically rotatory dispersion, in order to attain an appreciable effect in improvement of image quality with a reduced cost. The liquid cell 1 used in this embodiment is of NB mode and has a construction which is the same as that shown in FIG. 14. All the three cells have identical construction and optical characteristics. The double refraction index Δn of the liquid crystal is 0.093, while the thickness of the liquid crystal layer is 5.0 μm. The retardation value Δnd of the phase plate used for the blue color panel is 270 nm. As will be seen from FIG. 6A, the direction 11b of orientation of the light-emitting side of the liquid crystal, the retardation phase axis 13a of the phase plate and the direction 12b of the light interruption axis of the light-emitting side polarizing plate 2b are arranged with leftward twist with respect to the direction of running of the light.

Figure 7:
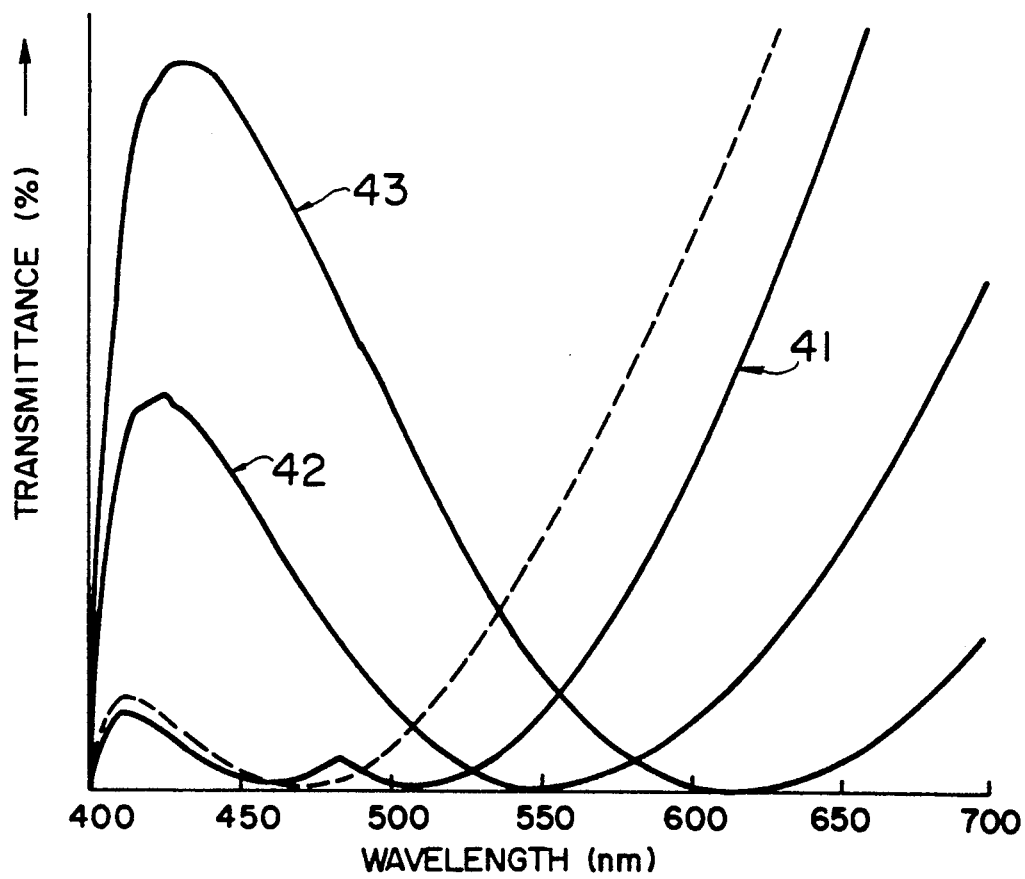
FIG. 7 is a graph representing the optical characteristic of the second embodiment, showing, in particular, the transmission characteristic in dark display operation.

FIG. 7 shows the optical characteristics of the panels for respective colors. In this Figure, the solid-line curves show spectral characteristics of the panels used in this embodiment as observed when no voltage is applied, while the broken line shows the characteristic as obtained when no phase plate is used in the blue color panel. From this Figure, it will be seen that the wavelength region of low transmittance is widened in the panel for blue colors, thus showing an improvement in the light interruption characteristic. As a result, the contrast of the panel for blue color has been improved to a level which is twice as high as that obtained when no phase plate is used. Thus, the second embodiment showed a display quality which is rather inferior to the first embodiment but is still much better than that produced by the conventional arrangement.

Third Embodiment

A third embodiment of the present invention will be described hereinunder. This embodiment is a liquid crystal display unit of forward projection type. In this embodiment, the liquid crystal layer thickness of liquid crystal cells are optimized for the wavelengths of the incident lights, and a pair of phase plates are used in combination with each of the liquid crystal cells for the respective colors, so as to realize projection display with a high image quality.

Figure 8:
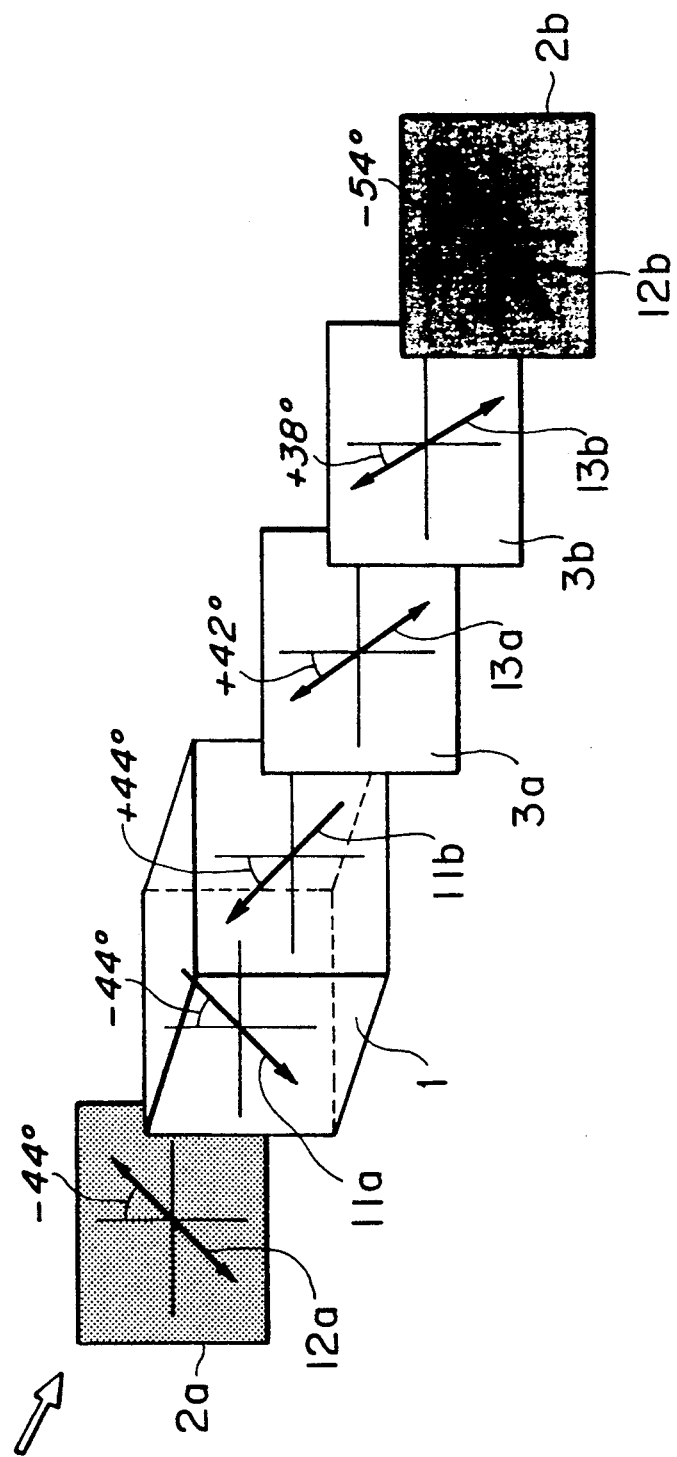
FIG. 8 is an illustration of the set angles of optical axes in the optical component used in a third embodiment of the present invention.

The basic arrangement of the optical system in this projection type liquid crystal display unit is substantially the same as that of the first embodiment shown in FIG. 1. Therefore, the intensity distributions of the blue, green and red color light 55, 56 and 57 are the same as those shown in FIG. 2. FIG. 8 shows the setting angles of optical axes of the liquid crystal panels which are disposed in the light paths for the blue, green and red colors. All these liquid crystal panels have identical set angles of optical axes. Namely, each of the liquid crystal panel is composed of a pair of polarizing plates 2, a liquid crystal cell 1 and a pair of phase plates 3. The phase plates 3 are disposed between the incident-side polarizing plate 2b and the liquid crystal cell 1. The direction 11b of orientation of the light-emitting side of the liquid crystal cell, the retardation phase axes 13a, 13b of two phase plates, and the direction 22b of the light-interruption axis 22b of the light-emitting side polarizing plate are arranged in leftward twist with respect to the direction of running of light. The phase plates of the panels for different colors have different retardation values. More specifically, the phase plates used in the panel for the blue color B has a retardation value Δnd of 240 nm, while the phase plates of the panels for the green and red colors G and R have retardation values Δnd of 270 nm and 300 nm, respectively. The liquid crystal cell used in this embodiment is of NB mode and has a high-density active matrix having about 300,000 pixels. The construction is the same as that shown by sectional view in FIG. 14. The thicknesses of the liquid crystal layers of the panels for blue, green and red colors are 4.4 μm, 5.0 μm and 5.7 μm. In each case, the liquid crystal has rightward twist of a twist angle of 88°. The double refraction index Δn of the liquid crystal is 0.0935.

Figure 9:
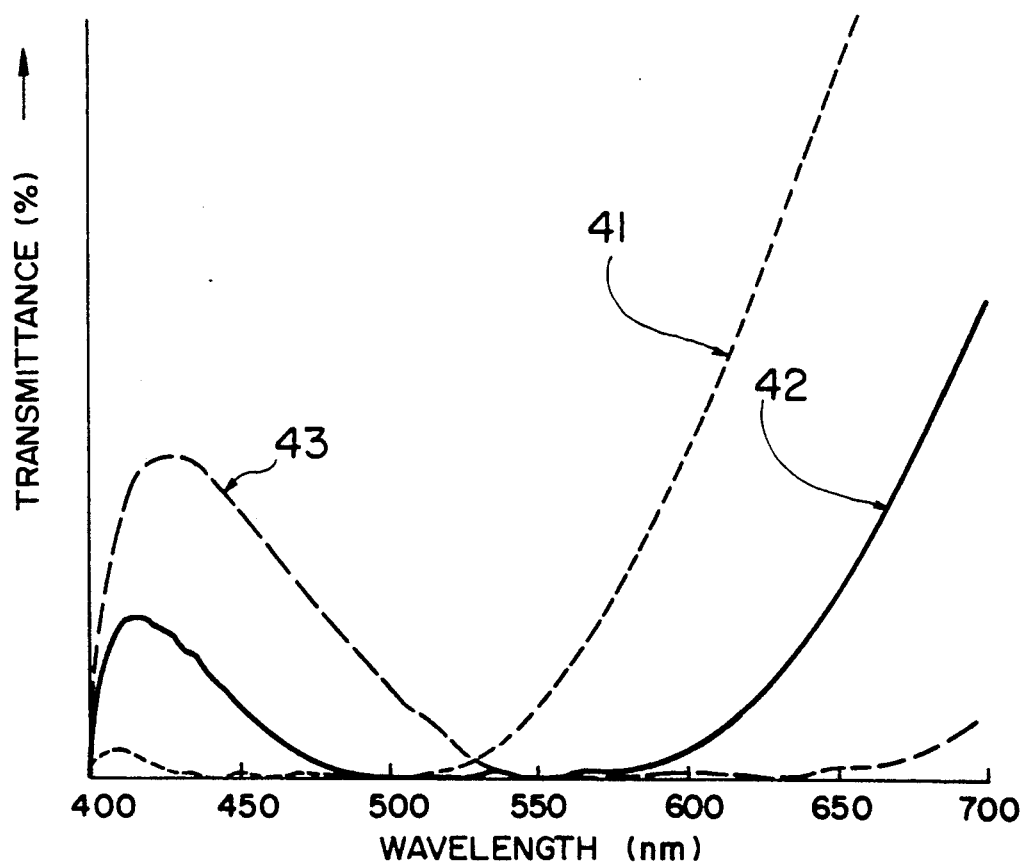
FIG. 9 is a graph representing the optical characteristic of the third embodiment, showing, in particular, the transmission characteristic in dark display operation.

FIG. 9 shows optical characteristics of the panels for the respective colors having above-described constructions. More specifically, this Figure is a graph showing spectral transmittance characteristics as observed when no voltage is applied. It will be seen that the wavelength region of low transmittance is widened so as to provide superior light interruption characteristic. Thus, the third embodiment exhibits contrast levels higher than those exhibited by the first embodiment. In addition, degradation of contrast in response to temperature change is reduced and fine image of projection display is obtainable. In fact, a full-color display of sufficiently high image quality was obtained even when enlarged to 100 inch display size.

Fourth Embodiment

This embodiment is a projection type liquid crystal display unit which employs NW mode liquid crystal panels. The liquid crystal panel of NW mode is bright when voltage is not applied and becomes dark when a voltage is applied. This type of liquid crystal panel, therefore, is not affected by optically rotatory dispersion in dark display operation, and can provide good light interruption characteristic and high contrast without difficulty. Unfortunately, however, this type of liquid crystal panel is unsatisfactory in the brightness level which is an important factor in projection type display units. This is attributed to the fact that the opening ratio is not so large in NW mode liquid crystals and to the influence of optically rotatory power of the liquid crystal in bright display operation. In this embodiment, therefore, the influence of optically rotatory power in bright display is eliminated by addition of phase plates so as to enable projection display at a high level of brightness.

The projection system itself is the same as that used in the first embodiment. The construction of the liquid cells also are identical to those of the first embodiment. In this embodiment, however, driving circuits for NW mode liquid crystal are connected to the liquid crystal cells.

Figure 10A:
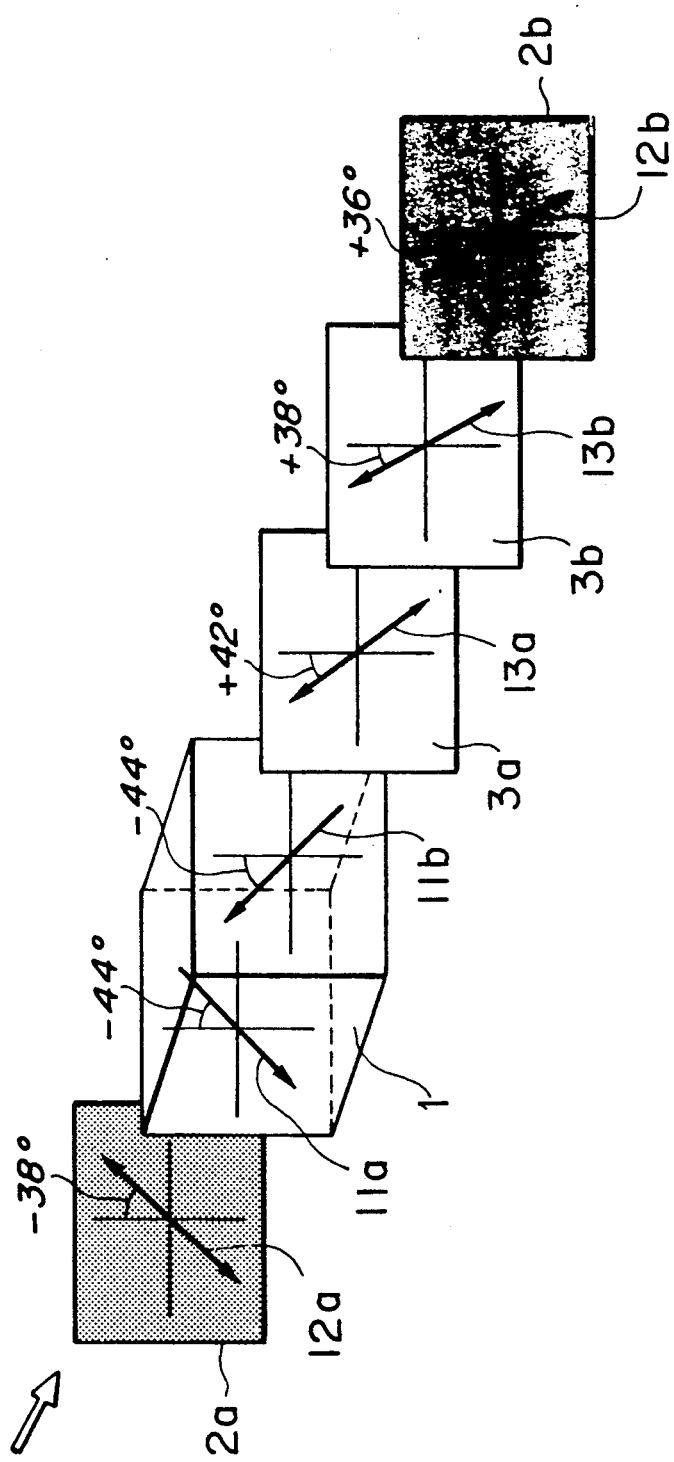
Figure 10C:
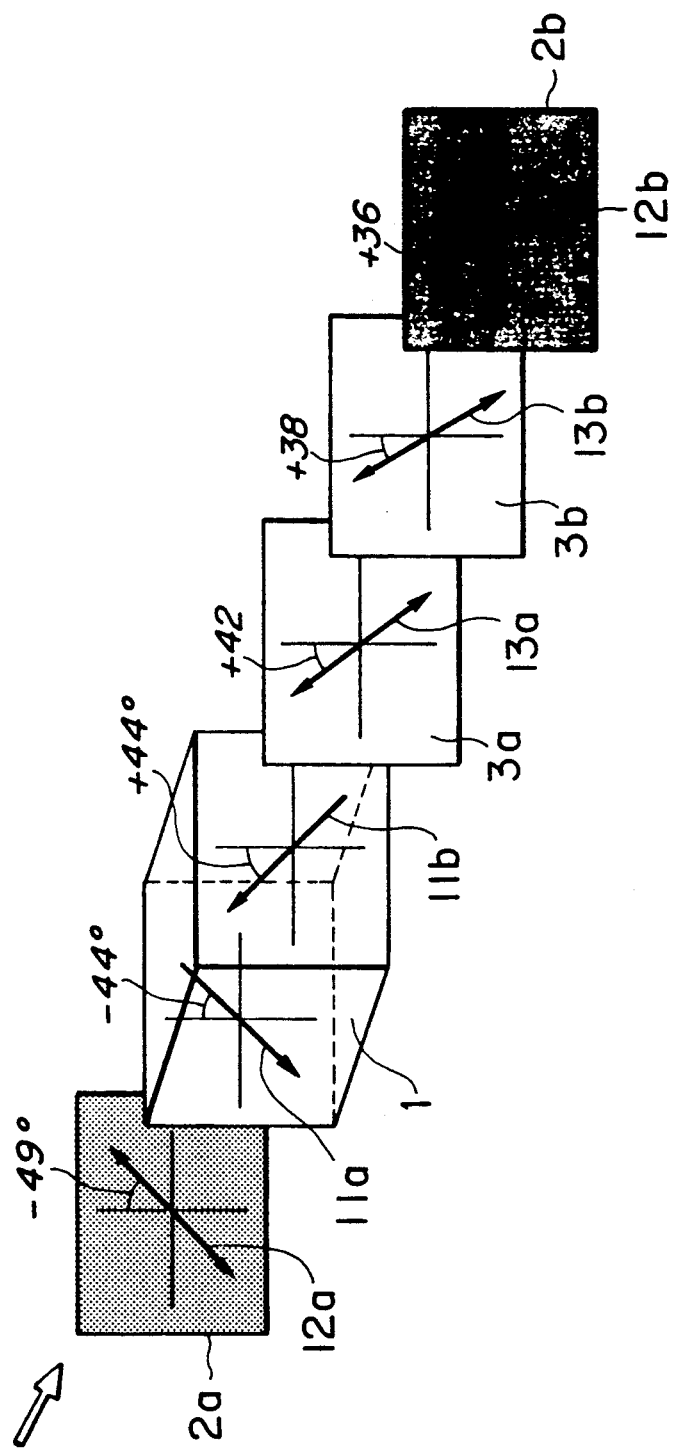
Figure 11:
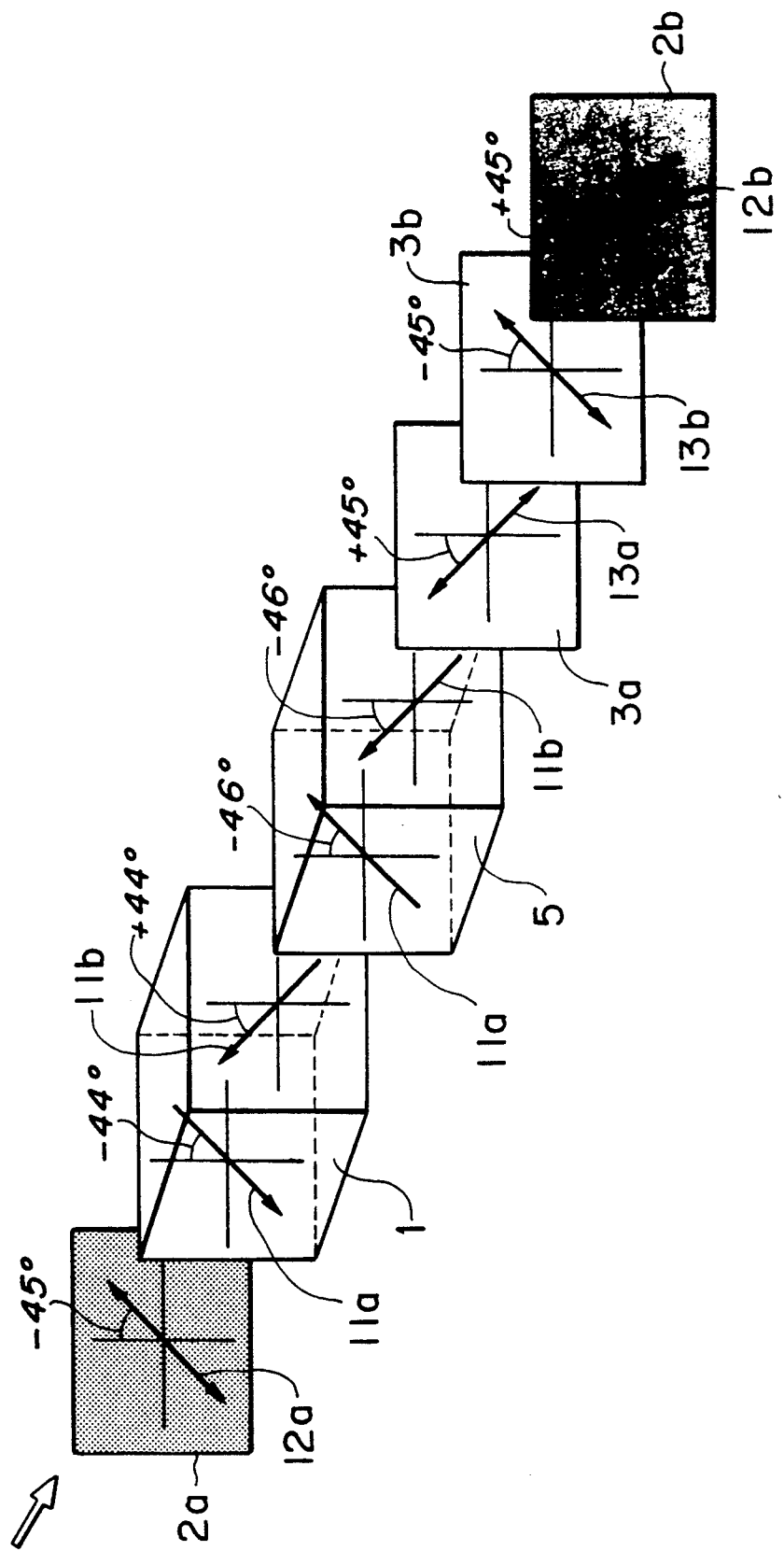
FIG. 11 is an illustration of the set angles of optical axes in the optical component used in a fifth embodiment of the present invention.

FIGS. 10A, 10B and 10C show constructions of the liquid crystal panels for blue, green and red colors. Each of these liquid crystal panels has a pair of polarizing plates 2, a liquid crystal cell 1 and a pair of phase plates 3. The pair of phase plates 3 are disposed between the liquid crystal cell 1 and the emitting-side polarizing plates 2b. All the phase plates have a retardation value nd of 300 nm.

This embodiment showed about 20% increase in the luminance in bright display operation, thus offering good quality of color projection display image.

Fifth Embodiment

This embodiment is a liquid crystal display unit in which compensation liquid crystal cells are used to compensate for influence of optically rotatory dispersion and, in addition, phase plates are incorporated so as to provide superior display characteristics over the entire area of the display screen including corners.

The system for compensating for influence of optically rotatory dispersion provides excellent light-interruption characteristics over a wide wavelength region, as well as superior contrast and color reproducibility. This system, however, suffers from a problem in that the image quality tends to degrade in the peripheral portions of the display screen, due to insufficient brightness in the bright display or restricted range of light incident angle which provided good display characteristics. In this embodiment, a pair of phase plates having optical axes which are substantially perpendicular to each other are used so as to widen the range of the light incident angle which provides good display characteristics, while eliminating degradation in the image quality in the peripheral portion of the display screen.

The optical system of the projection system itself is substantially the same as that shown in FIG. 1. A compensation liquid crystal cell 5 and a pair of phase plates 3a, 3b are disposed between the display liquid cell 1 and the light-emitting side polarizing plate 2b. The liquid crystal panels for blue, green and red colors have an identical construction. Namely, in each of the liquid display panels for blue, green and red colors, the display liquid crystal cell 1 has a rightward twist at a twisting angle of 88°, double refraction index Δn of the liquid crystal of 0.095 and a liquid crystal layer thickness of 4.8 μm. In contrast, the compensation liquid crystal cell 4 has a leftward twist at twisting angle of 88°. The double refraction index and the liquid crystal layer thickness are the same as those of the display liquid crystal cell 1. All the phase plates used in this embodiment have an equal retardation value Δnd of 300 nm. The pair of phase plates for each color is arranged so that optical axes of the phase plates are orthogonal to each other.

It was confirmed that the above-described arrangement provides good display characteristics with superior contrast and color reproducibility over the entire area of the projection screen including peripheral and corner portions thereof when the image is enlarged and projected on a screen.

Sixth Embodiment

A sixth embodiment of the invention will now be described. This embodiment is applicable to any of preceding embodiments and features a mechanism which enables adjustment of set angles of the optical axes of the phase plates and polarizing plates. This angle adjusting mechanism enables compensation for any degradation such as a change in the color tone caused by, for example, a change in temperature or degradation of the lamp and polarizing plates. In addition, it is possible to mechanically effect delicate adjustment of angle and colors of image on display so as to optimize the image quality.

Figure 12:
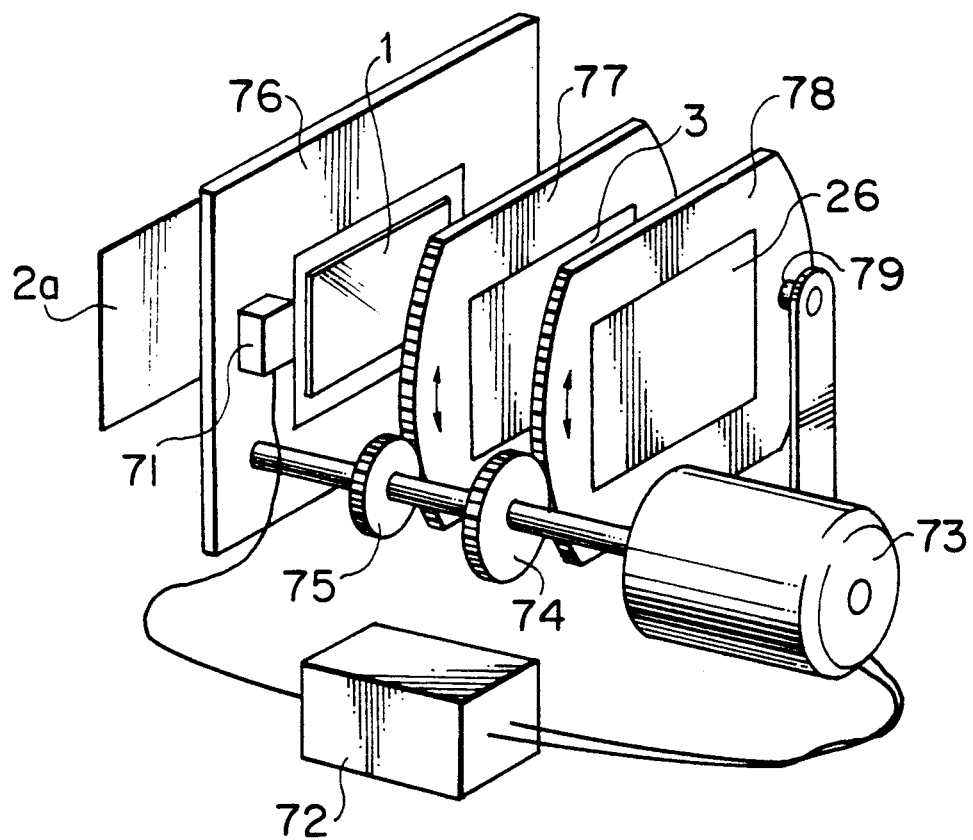
FIG. 12 is a schematic illustration of a mechanism for adjusting setting angles of the optical axes in the first embodiment of the present invention.
Figure 13:
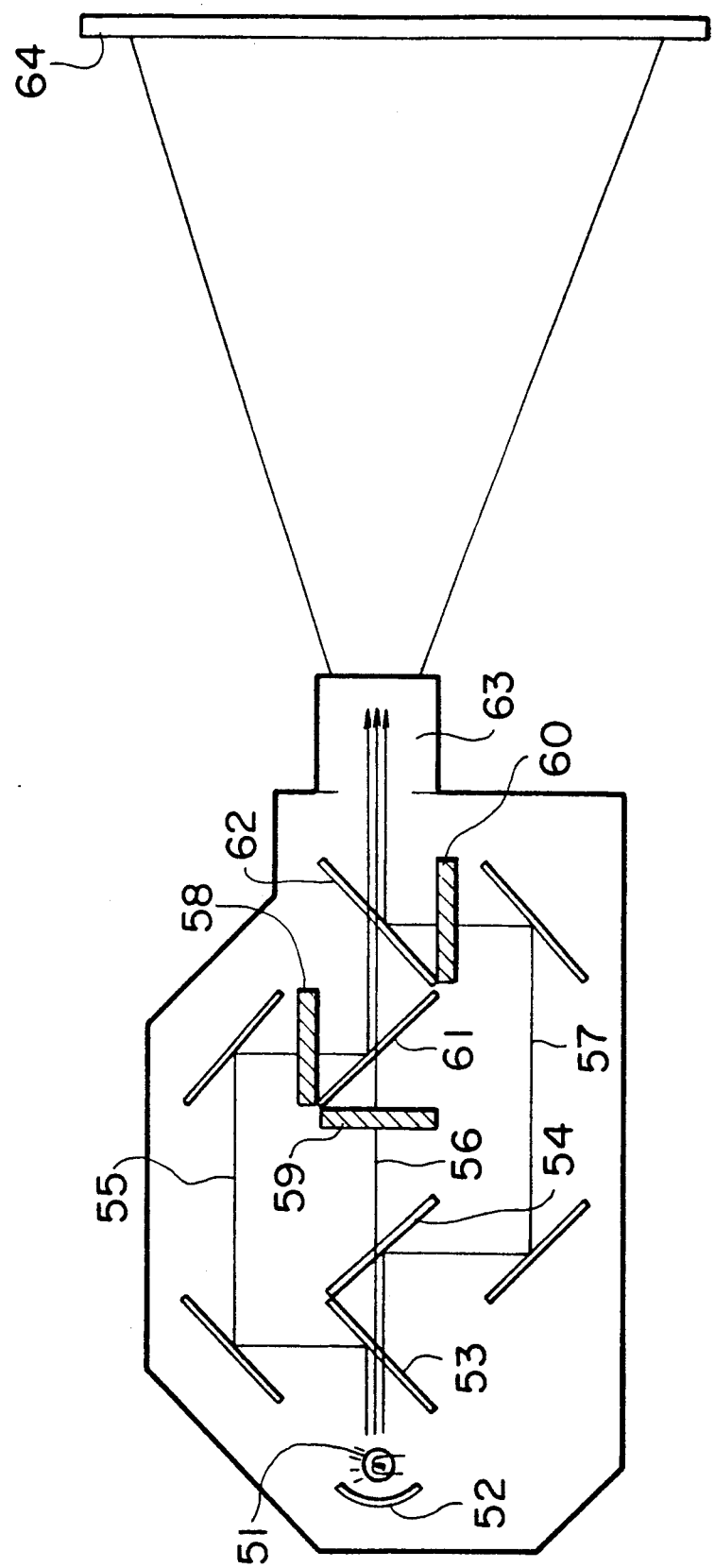
FIG. 13 is an illustration of an optical arrangement used in prior art front projection type liquid crystal display unit.

This embodiment makes use of three liquid crystal panels for blue, green and red colors, respectively, each panel including a single phase plate. The overall construction is the same as that shown in FIG. 5. FIG. 12 schematically illustrates the optical axis angle adjusting mechanism for one of the liquid crystal panels used in this embodiment. The angle adjustment is effected both on the phase plate 3 and the light-emitting side polarizing pate 2b. The phase plate 3 and the polarizing plate 2b are secured to holders 77 and 78 which are pivotable around the axis of a shaft 79. A temperature sensor 71 disposed in the vicinity of the liquid crystal cell 1 is capable of sensing the temperature of the liquid crystal cell 1. A temperature signal derived from the temperature sensor 71 is suitably processed by a controller 72 which controls a motor 73 so that the set angles of the phase plate 3 and the light-emitting side polarizing plate 2b are changed through gears 74, 75 which are secured to the motor shaft.

This embodiment, when combined with any one of the first to fifth embodiments described before, enables compensation for any change caused by a change in temperature, thus making it possible to maintain good quality of image initially set on the display unit.

Although the sixth embodiment as described employs only one driving motor, this is not exclusive and two or more driving motors may be used to control the angles of the respective optical elements, so as to enable a more delicate compensation against change in temperature.

In the embodiments described hereinbefore, a film which generates a phase difference of light, produced by drawing polycarbonate or polyvinylalcohol, is used as the phase plates. According to the invention, however, any suitable optical material which exhibits double refraction and high transmission may be used as the material of the phase plate. For instance, a crystalline optical material such as quartz can be used equally well.

In the embodiments described hereinbefore, polarizing plates made of polymeric films are used as the polarizing means. In the projection type liquid crystal display unit of the invention, however, the polarization may be effected by other types of polarizing means such as a polarization beam splitter disposed in the path of light.

It is also to be noted that, when a plurality of phase plates are used for each panel, these phase plates may be arranged on both sides of the liquid crystal cell, although in the described embodiments the phase plates are disposed on the same side of the liquid crystal cell.

As will be understood from the foregoing description, according to the present invention, it is possible to obtain a projection type liquid crystal display unit having improved light-interruption characteristic in dark display operation, as well as improved contrast and color reproducibility. In addition, it is possible to eliminate any coloring of display in the absence of voltage and to perform display at a high contrast level, without suffering from offset of color tone when a voltage is applied and without any difficulty. Thus, the present invention provides a direct visual type image display panel and projection type display unit which have superior display characteristics and which can display images of good quality.

What is claimed is:

1. A projection type liquid crystal display unit having a plurality of light paths for light of different wavelength regions, said display unit comprising:
a first optical arrangement provided in a first one of the light paths and a second optical arrangement provided in a second one of the light paths, each of said first optical arrangement and said second optical arrangement including (a) a pair of polarizing means each having at least one of a light interruption axis and a light transmission axis, (b) a twist nematic liquid crystal cell having front and rear surfaces and an orientation twisted in a twist direction, said liquid crystal cell in each of said first one of said light paths and said second one of said light paths having substantially identical characteristics, and (c) a first phase plate disposed between said pair of polarizing means and having a retardation phase axis and a retardation value; wherein said first optical arrangement is characterized in that (i) one of a set angle of the orientation of the liquid crystal cell, a set angle of the retardation phase axis of said phase plate and a set angle of the one of the light interruption axis and the light transmission axis of said pair of polarizing means are different from those of the second optical arrangement, and (ii) said retardation value of said phase plate is different from that of the second optical arrangement, wherein at least one of said first and second optical arrangements has a second phase plate which is disposed between said pair of polarization means and has a retardation phase axis which is substantially orthogonal to said retardation phase axis of said first phase plate that is included in a same one of said first and second optical arrangements.

2. A projection type liquid crystal display unit having a plurality of light paths for light of different wavelength regions, said display unit comprising:
an optical arrangement provided in one of said light paths for light of a shortest wavelength region of said different wavelength regions, said optical arrangement including (a) a pair of polarizing means each having a light interruption axis, (b) a twist nematic liquid crystal cell having an orientation twisted in a twist direction and (c) a first phase plate and a second phase plate both disposed between said pair of polarizing means and each having a retardation phase axis and a retardation value, wherein said retardation phase axes of said first and second phase plates are substantially orthogonal to each other.

* * * * *